Patented Mar. 1, 1932

1,848,042

UNITED STATES PATENT OFFICE

ALFRED BERGHAUSEN, OF CINCINNATI, OHIO, ASSIGNOR TO E. BERGHAUSEN CHEMICAL CO., OF CINCINNATI, OHIO, A CORPORATION OF OHIO

FOAM STABILIZER FOR FIRE EXTINGUISHERS

No Drawing. Application filed August 15, 1928. Serial No. 299,867.

My object is to provide a foam stabilizer for fire extinguishers which will produce a thick, heavy foam for blanketing a fire, and which may be cheaply manufactured from substances practically universally available. These and other objects of my invention I attain in that product and process of making it, a preferred embodiment of which I shall now describe.

Hitherto foam stabilizers have comprised for the most part secondary extracts of such materials as sweet wood, oak bark and the like, and while the cost of these extracts is somewhat diminished by the more valuable products recovered from the primary extraction, nevertheless they have been comparatively expensive and their manufacture is obviously restricted geographically.

I have discovered that an excellent foam stabilizer may be prepared from extractions of plants of the family Leguminosæ and particularly those of the genus Medicago sativa of which alfalfa and clover are the most available.

I have been able to make excellent foam stabilizers not only from primary extracts of plants of this character but also of secondary extracts; and so far as the extracted substances go, neutral, alkaline and acid extractions all appear to work very well, excepting that if the stabilizer is to be mixed in a fire extinguisher with the sodium bicarbonate solution, and acid extraction is not ordinarily suitable because any residual acid therein will react with the sodium bicarbonate.

In making a satisfactory foam stabilizer, I prefer to take a quantity of commercial alfalfa, say 100 lbs. and extract this with boiling water in an ordinary extraction apparatus. After draining, the extract is concentrated by boiling to about 25° Baumé and can be used in this form.

The residue from the first extraction may be secondarily extracted with water containing about two ounces of lye per gallon and this secondary extract will also be concentrated to 25° Baumé.

While both of these extractions are excellent foam stabilizers, I have found it advantageous to combine for best results portions of the two extractions already described; that is to say, for example, 50% of the primary water extraction and 50% of the secondary caustic extraction. The material concentrated to 25° Baumé will be of a syrupy viscosity. This is my preferred procedure and I find that it gives best results; almost as satisfactory a result is obtained, however, by making a single primary lye extraction.

A satisfactory formula for a commercial fire extinguisher comprises six ounces of my foam stabilizer and thirty ounces of sodium bicarbonate dissolved at around 90° Fahrenheit in the fifteen pints of water required by the extinguisher. For the substances in the small container 22 ounces of commercial aluminum sulphate may be disolved in two and one quarter pints of water as is the common practise.

Pressure or vacuum extractions and vacuum concentrating processes are applicable to the production of my foam stabilizer; but they are not necessary. I may, if desired, treat my foam stabilizer with a preservative so that it may be kept and shipped in the concentrated form for use in fire extinguishers as desired. I may for this purpose, use any common preservative for organic substances; the one which I prefer to use is ammoniacal copper sulphate.

Having thus described my invention, what I claim as new and desire to secure by Letters Patent, is:—

1. A foam stabilizer comprising a mixture of a neutral water extraction of alfalfa and an alkaline extraction of alfalfa.

2. A foam stabilizer comprising a mixture of a neutral water extraction of alfalfa and an alkaline extraction of alfalfa, said mixture concentrated to about 25° Baumé.

3. A stable fire extinguishing foam comprising foam making materials and an extract of alfalfa.

4. A process of producing a stable fire extinguishing foam which comprises adding to water a material extracted from alfalfa, and producing bubbles of gas in said water.

5. A process of producing a stable fire extinguishing foam which comprises adding to water a material extracted from alfalfa, and a gasifying material.

6. A process of producing a stable fire extinguishing foam which comprises dissolving in water a material extracted from leguminous plants of the genus Medicago sativa and a salt of carbonic acid, and thereafter adding to said water a material having an acid reaction.

ALFRED BERGHAUSEN.